United States Patent [19]

Duret et al.

[11] Patent Number: 4,605,846

[45] Date of Patent: Aug. 12, 1986

[54] OPTICALLY READABLE CARD CARRYING DIGITAL DATA, AND AN ACCESS CONTROL SYSTEM USING SAID CARD

[75] Inventors: Bernard Duret, Brissac-Quince; Guido G. Dall'oro, Angers; Alain Jollivet, Beaufort; Annie M. Szeger, Angers, all of France

[73] Assignee: Societe d'Electronique de la Region Pays de Loire, Paris, France

[21] Appl. No.: 586,918

[22] Filed: Mar. 7, 1984

[30] Foreign Application Priority Data

Mar. 11, 1983 [FR] France ................................. 83 04054

[51] Int. Cl.⁴ .................................................. G06K 7/10
[52] U.S. Cl. ....................................... 235/468; 235/456; 235/494; 283/901
[58] Field of Search ............... 235/456, 468, 494, 465, 235/468; 283/88, 901, 902, 73

[56] References Cited

U.S. PATENT DOCUMENTS

| | | | |
|---|---|---|---|
| 3,211,470 | 10/1965 | Wilson | 235/494 X |
| 3,238,501 | 3/1966 | Max et al. | 235/494 X |
| 3,536,894 | 10/1970 | Travioli | 235/468 X |
| 3,621,589 | 11/1971 | Jones | |
| 4,237,375 | 12/1980 | Granholm | 235/456 X |
| 4,504,084 | 3/1985 | Jauch | 283/901 X |

FOREIGN PATENT DOCUMENTS 3109288 9/1982 Fed. Rep. of Germany.
8100776 3/1981 PCT Int'l Appl.

*Primary Examiner*—David L. Trafton
*Attorney, Agent, or Firm*—Pollock, VandeSande & Priddy

[57] ABSTRACT

The card is particularly intended to give a card-holder access to a service such as pay-TV (broadcast or cable), but in principle could be adapted to any lock-and-key type of system, e.g. credit cards, cards giving access to computer terminals or rooms, etc. The data is encoded on the card in the form of data-significant marks and spaces (2, 3). For example, the marks (2) may be distributed along two parallel tracks with marks in one track representing "1" bits and marks in the other track representing "0" bits. Dummy marks (20, 21, 30, 31, 32, 33) are also made on the card. The dummy marks have the same appearance to the human eye and to photographic and photocopying equipment as the data-significant marks. However, they are printed using inks having a different response in an invisible part of the spectrum, so that card reading equipment can be made to treat dummy marks differently from the way it treats data-significant marks. This makes the cards difficult to fake using commonly available equipment.

11 Claims, 7 Drawing Figures

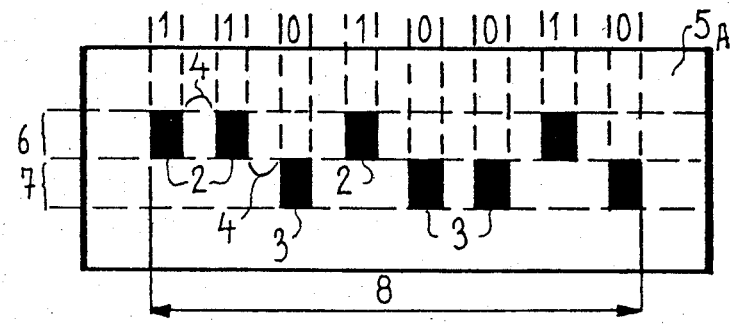
FIG_1
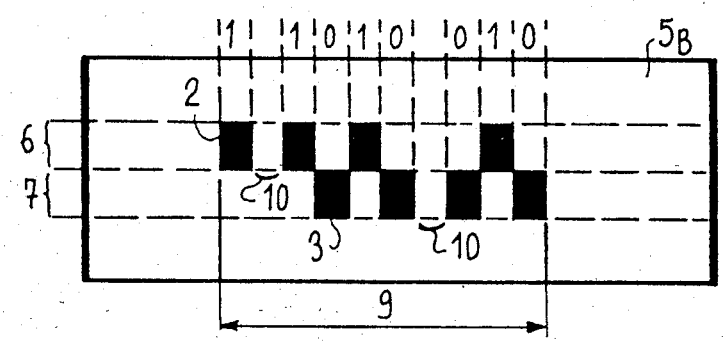
FIG_2
FIG_3
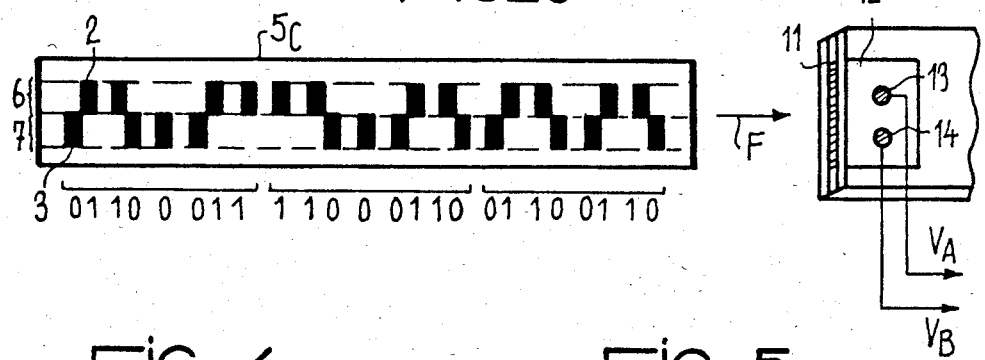
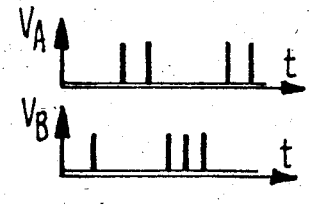
FIG_4
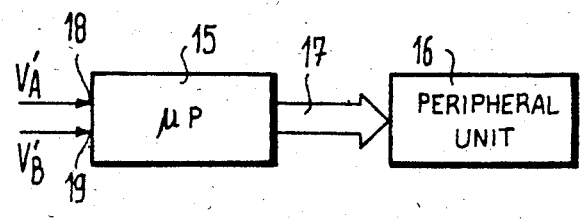
FIG_5

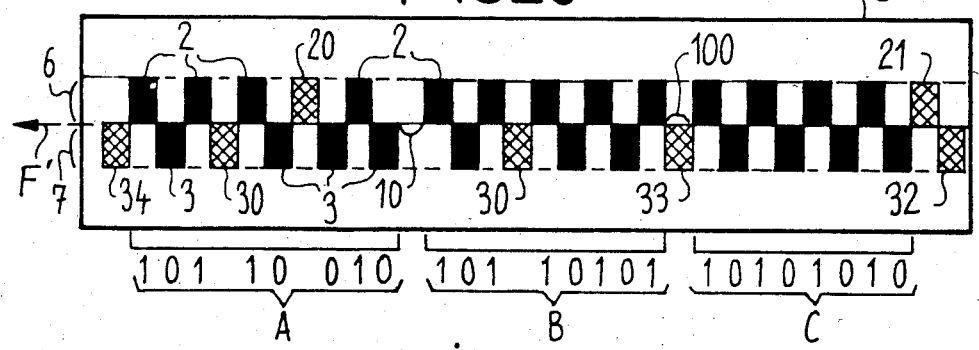
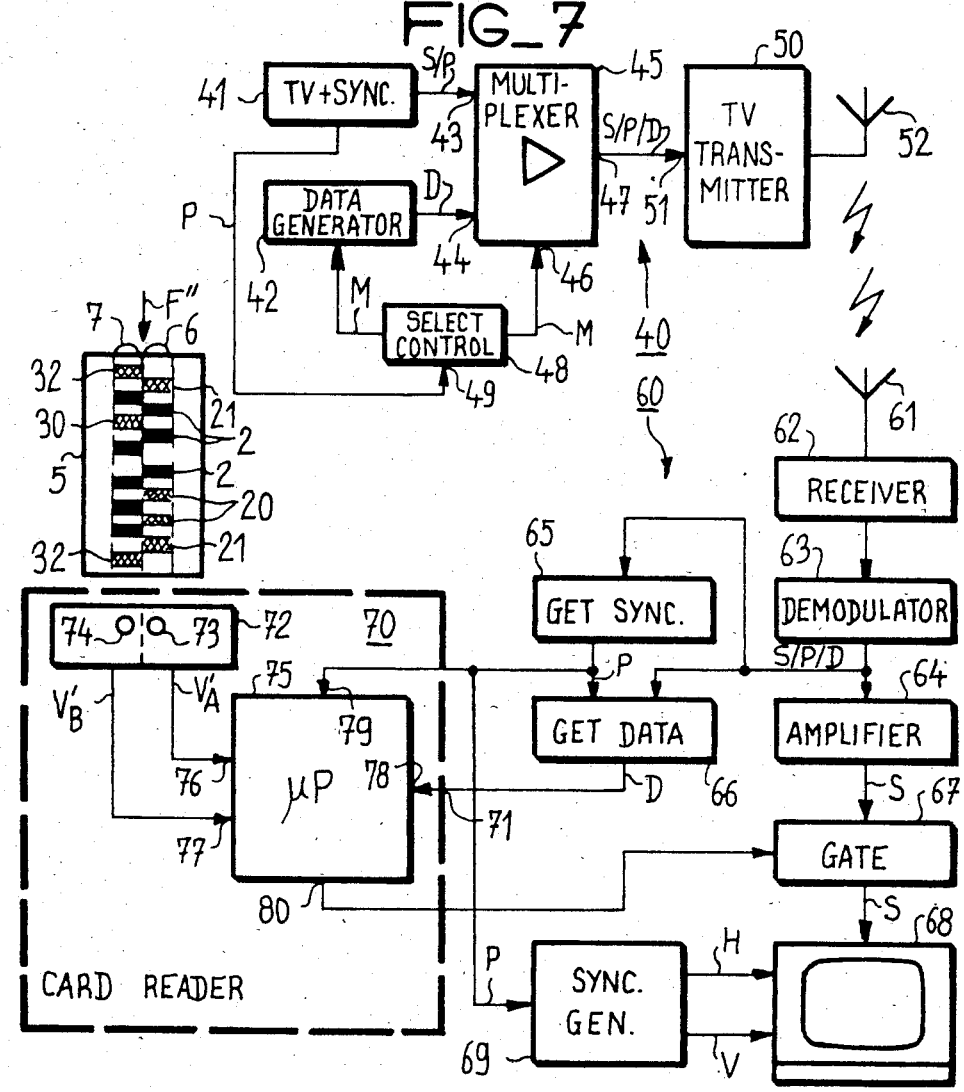

OPTICALLY READABLE CARD CARRYING DIGITAL DATA, AND AN ACCESS CONTROL SYSTEM USING SAID CARD

BACKGROUND OF THE INVENTION

1. Field of the Invention

The present invention relates to optically readable cards carrying a digital data message which is used to control access to a service, e.g. to a pay-TV program which may be broadcast over the air or else transmitted by electrical or optical fiber cable. The invention also relates to a system which uses such cards to control access to such a service.

2. Description of the Prior Art

Cards carrying an encoded message for providing the cardholder with access to a service are well known. Although the details vary from system to system, the same general principles apply, for example, to tickets that give access to public transport, to credit cards that give access to bank note dispensers, and to subscriber cards that enable unscrambler (or decoder) equipment to unscramble (decode) pay-TV programs.

The particular size of the card used may vary from system to system, as may the material from which the "card" is made. Thus, for example, credit cards are generally made of plastic and occupy rather more than twice the area of railway tickets which, in contrast, are generally made of cardboard. For the purpose of the present invention, credit cards and railway tickets are merely common examples of the kind of card to which the invention is applicable, and neither the size nor the material of the card is critical.

There are several ways of encoding data on such cards: the cards may be perforated with perforations that can be read optically or by electrical contact; the cards may include a magnetic medium which is read like a tape recording as the card moves past a read head; the cards may include a semiconductor memory chip; the cards may have optically readable marks; etc. In a system using such cards, the cards are read by suitable apparatus which transmits one or more digital words from the card for further use by the rest of the system. The transmission is generally serial, i.e. bit-by-bit.

In a simple system, the card acts very like a key in a lock, in other words data stored on the card is merely compared with data stored in the system (e.g. by loading a word in parallel from a read only memory (ROM) into a shift register and then comparing that word bit-by-bit with the word read from the card). If the two words are identical, then the card holder is given access to the service, otherwise access is denied.

In a more complicated system, data read from the card is stored in one or more suitable memories of the system, and in addition to simply determining whether access is to be given or denied, the system can select a particular service from a plurality of services, set a limit (e.g. a credit limit) on a service, or check whether the card-holder knows a "pass word".

All such systems are open to abuse by means of counterfeit cards. While it is relatively difficult for most of the people to counterfeit cards with magnetically encoded data (i.e. most people do not have access to equipment for reading and writing digital recordings), optically readable cards are much easier to counterfeit. This is true regardless of whether the optically readable card encodes data by means of punched holes or by means of visible marks (like the bar codes used for retail checkout points). A genuine card can readily be copied with sufficient accuracy to produce a working counterfeit by using hand tools or a photocopier.

Preferred embodiments of the present invention provide an optically readable card carrying a digital data message which is substantially impossible to counterfeit without special photographic or opto-electronic equipment.

SUMMARY OF THE INVENTION

The present invention provides an optically readable card carrying a digital data message in the form of at least one succession of marks and spaces having respective different optical properties and suitable for detection by means of an opto-electronic pick-up including a source of light radiation and a detector therefor, wherein said succession of marks includes significant marks having a first optical or spectral response, interspersed with dummy marks having the same appearance as first marks to the eye and to photographic or photocopying equipment, but responding to light emitted by said source of light radiation with a second optical or spectral response which is analogous to the response of said spaces to said radiation.

The present invention also provides an access control system using optically readable cards as defined above.

BRIEF DESCRIPTION OF THE DRAWINGS

Embodiments of the invention are described by way of example with reference to the accompanying drawings, in which:

FIGS. 1 and 2 are plan views showing two possible ways of marking a card to encode digital data;

FIG. 3 is a diagram showing how such cards are presented to an optical reader;

FIG. 4 is a waveform diagram showing the signals delivered by the optical reader;

FIG. 5 is a block diagram of a circuit for converting such signals into data;

FIG. 6 is a plan view of a card similar to FIGS. 1 and 2, but including dummy marks in accordance with the invention; and FIG. 7 is a simplified block diagram of an entire access control system in accordance with the invention.

MORE DETAILED DESCRIPTION OF PREFERRED EMBODIMENTS

FIG. 1 is a plan view of a card having data encoded thereon by a first marking scheme using visible marks. The marks are in the form of discrete bars placed across two parallel tracks.

The digital data is stored on a card 5A in the form of a sequence of binary "1s" or "0s" which may be grouped into digital words of desired length by the system designer, e.g. into words of eight bits each, commonly called "bytes". The logical "1" or "0" states are represented by a pattern of rectangular bars 2 and 3 placed across a pair of parallel tracks 6 and 7. The bars have a detectably different coefficient of reflection from the surrounding, unmarked card surface, and in particular from the spaces 4 on the tracks 6 and 7 between the bars. The spaces 4 have no binary significance per se, but merely serve to separate adjacent bars.

The first track 6 contains bars 2 representing logical "1s" whereas the second track 7 contains bars 3 representing logical "0s". The bars are rectangular and all of the same size and shape. They are disposed across the tracks which are parallel to each other and to the long side of the card as a whole in the usual case of the card being rectangular. In order to read this two-track code, the two tracks 6 and 7 should be read simultaneously using an optical reader having two read heads. For example, two opto-electronic pick-ups may be disposed side-by-side with their optical axes normal to the plane of the card, and mechanical means should be arranged to pass the card past the pick-ups so that both tracks are scanned simultaneously.

In FIG. 1 the card is shown as being encoded with the binary word 11010010 (if read from left to right, or 01001011 if read from right to left). When two successive bits in the word are of the same binary value, the corresponding bars are separated by a space 4 of substantially the same width as a bar. Since a bit must by definition have one and one only of two logical states, a bar in one track is accompanied by a space in the other track. The FIG. 1 code also uses an inter-bit space in both tracks, so that a "0" bit is marked in track 7, say, there are at least three consecutive unit spaces in track 6.

Thus, to be able to represent all possible combinations of an n-bit word, a total length 8 of at least 2n−1 unit spaces is required on the card.

FIG. 2 shows a card 5B similar to the card 5A of FIG. 1, but using a coding scheme that enables the length occupied by a word to be compressed. Wherever possible, a bar in one track is placed opposite a single unit space in the other track, rather than opposite a run of at least three unit spaces. Both FIGS. 1 and 2 show the same binary word encoded on the card. Wherever there is a run of two or more identical bits in the word, the code length on the card in FIG. 2 is the same as the code length in FIG. 1. However, whenever there is an alternation between a "1" bit and a "0" bit, or *vice versa*, the bar in one of the tracks is placed opposite the first, and maybe only inter-bar space 10 on the other track. This has the result of writing n-bit words in a length 9 which varies from a longest case of 2n−1 unit spaces for a sequence of all "1s" or all "0s", to a shortest case of n unit spaces for an alternating sequence of "1s" and "0s".

It is not essential for the two tracks 6 and 7 to be side-by-side as shown in FIGS. 1 and 2, the only essential requirement is that they should be parallel so that they can be read by two read heads simultaneously during the same displacement of the card. An advantageous arrangement is to have one track on each side of the card, since registration then becomes a problem for the casual counterfeiter.

A two-track code has the following advantages:

The number of available symbols depends only on the available space and on the user's requirements;

The code is readable (within an upper limit imposed by the optical reader's minimum response time) regardless of variations in the speed with which the card passes the reader, thus enabling the card to be moved past the reader by hand; and Signal acquisition and processing can be performed extremely simply and reliably.

It is important to observe that this code only requires bars and spaces to be distinguished on each line, and in particular, the thickness of the bars or the spaces is immaterial. This means that the quality with which the bars are printed and the quality of the surface on which the bars are printed are of secondary importance.

FIG. 3 shows a card 5C with three binary words encoded thereon in the manner shown in FIG. 2. The card 5C is shown just before entering a read slot 11 in an optical reader.

The three words are the following eight-bit bytes: 01100011, 11000110, and 01100110 (reading from left to right, so the reader will read them in reverse order).

The data may be acquired particularly simply and reliably. The reader 12 has two opto-electronic pick-ups 13 and 14 for reading the tracks 6 and 7 respectively. The inlet slot 11 enables the card 5C to be inserted manually in the direction of the arrow F. The sides of the slot 11 provide lateral guidance for the card as it passes through the reader. As the card passes through the reader 12 the pick-ups 13 and 14 provide two rectangular output pulse trains VA and VB. The pulses VA represent "1" bits while the pulses VB represent "0" bits. The data bytes are readily reconstituted from the pulse trains VA and VB by means of pulse shaping circuits, a shift register and means for suitably loading the shift register in series from the pulse trains and for clocking it on the basis of both pulse trains.

FIG. 4 is a waveform diagram of the pulse trains VA and VB as supplied by the pick-ups 13 and 14. As shown, the pulse trains read together represent 01100011 which is the middle byte read from right to left (i.e. in the direction of the arrow F).

FIG. 5 is a block diagram showing how the pulse trains VA and VB may be acquired in a particularly simple manner by a microprocessor 15.

The optical pick-up output signals are shaped, in particular to avoid spurious response to noise, and the "1" and "0" bits they represent are stored sequentially in a shift register (or any other serial-in memory device). The entire byte is then read out from the shift register in parallel, and may be applied directly to the microprocessor 15.

As shown in FIG. 5, the shaped signals V'A and V'B are applied to two respective interrupt inputs 18 and 19 to the microprocessor 15 in series as they arrive. In this case the microprocessor performs the necessary serial to parallel conversion itself. Alternatively, the shaped pulses could be received in an external shift register, and the microprocessor would then be interrupted to read the entire word once it became available.

The microprocessor 15 is connected via a bus 17 to a peripheral unit 16 for actually providing access to a service under the control of the microprocessor once the microprocessor is satisfied with the data it has read from the card. Clearly forms of connection other than a bus 17 could be provided to the peripheral unit 16, e.g. a serial interface.

There are various ways in which the data read asynchronously from the card may be synchronized for further processing, e.g. a shift register may be clocked for reading serial input pulses by the pulses themselves, while being read (and optionally looped back on itself) under the control of a system clock. Successive words may be separated simply by counting pulses, e.g. by applying both shaped pulse trains V'A and V'B to respective inputs of an OR gate and counting output pulses therefrom. The demarcation between which tasks are performed directly by the microprocessor and which tasks are performed by specialized hardware is a design choice and of no special significance in the implementation of the invention.

None of the FIGS. 1, 2 or 3, show a lifelike "portrait" of a practical card. Nor do they show card thickness or card material. Practical cards may be as small as tickets for public transport, or as large as credit cards, or even larger. They will generally be rectangular in shape and elongate to impose longitudinal reading of the tracks. They may be made of card per se (like transportation tickets) or of any other material on which marks can be printed, e.g. plastic. The card material may be transparent, semi-transparent or opaque to the light used for reading the bars. The significance of bars and spaces may be inverted relative to the above description (i.e. light bars may be marked on a dark background), or bars may be of one color and spaces of another color, or the bars or the spaces may be represented by holes. The above features will in general be chosen on criteria other than those directly applicable to the invention, e.g. ease of dispensing cards using automatic machinery, expected useful lifetime, etc.

As is mentioned above, the main drawback of using optically readable cards is the ease with which they may be counterfeited or illicitly reproduced, eg. by means of a photocopier or by hand copying. This is made a little more difficult in a two-track code by putting the two tracks on opposite faces of the card, posing registration problems for the copier. The two tracks could also be running along opposite long sides of a rectangular card, but making copying more difficult would also increase the cost of card readers and of devices for making cards legally.

The present invention seeks to mitigate this drawback by interspersing "dummy" marks in with the genuine marks on a card. The dummy marks should have the same appearance as genuine marks when observed by the human eye or when copied by commonly available photocopying or photographic equipment, but should have the same appearance as spaces when viewed by the optical pick-ups which are designed to operate under "light" of a predetermined spectral composition. In practice, that means using "light" which has an infrared or an ultraviolet component which is invisible to the human eye.

FIG. 6 is a plan view of an optically readable card using a two-track bar code, which card has a binary data message recorded on it using the compressed bar code technique of FIG. 2, but further including a plurality of dummy bars to decoy a would-be copier. The dummy bars 20, 21, 30–34 are drawn cross-hatched, but it will be understood that when viewed by the human eye or an ordinary photocopier they must look just like genuine bars.

The message on the card 5 comprises three words A, B, and C. As can be seen, even when the compressed technique of FIG. 2 is used, there still exist runs of three or more adjacent blanks in one of the parallel tracks each time there are two or more successive bits of the value represented by bars in the other track. The middle blank of such runs is replaced by a dummy bar. Dummy bars are therefore particularly to be found in the middles of words each time there are two successive bits of the same value, and the dummy bars 30 (between two successive "1s"), and 20 (between two successive "0s") are dummy bars of this type. Additional dummy bars can also be inserted before or after the message as a whole, e.g. the dummy marks 21, 32, and 34, and also between adjacent words, particularly where the last bit of one word is the same as the first bit of the next word, e.g. the dummy bar 33 which occupies an inter-word space 100. Where one word ends with a bit opposite to the first bit of the next word, it may be necessary to leave a space 10, but it may also be possible to run the words together or to space them far enough apart to be able to insert an even number of adjacent dummy bars. Such details depend on the word separating logic of the system which reads the cards.

The maximum number of dummy bars that could be inserted in a word without pointlessly lengthening the word is $n-1$ dummy bars in a word of $2n-1$ unit spaces length representing all "1s" or all "0s"

It is not essential to insert dummy bars in all the places where a dummy bar could be inserted.

In a particular embodiment, the card is made of pale paper that reflects infrared radiation. The significant bars are printed in type 1807/6 ink which appears black to the human eye and which also absorbs infrared radiation while the dummy bars are printed in type 1863/IR ink which is transparent to infrared radiation, thus allowing the card to reflect infrared through the ink, while appearing black in visible light. Both of these inks may be obtained from the French "Y'SO" company of 80480 Bacouel-sur-Selle.

For such a card that reflects infrared radiation, the optical reader may be made using a reflection pick-up such as the photoswitch "OPIC" type GP-2A01 made by the Japanese "Sharp Corporation" of Osaka. This kind of pick-up includes a source of infrared radiation constituted by an infrared light emitting diode (LED) made of gallium arsenide (GaAs), and a photodiode having a suitable optical response and preceded by an optical filter for eliminating visible light. The photodiode is followed by an integrated operational amplifier including its automatic level control circuit, a schmitt triggered flipflop and an output state having an open collector bipolar output transistor. Since the phototransistor is made of silicon, the entire circuit, other than the LED which is made of GaAs, can be integrated on the same silicon substrate. This detector provides a rectangular pulse output signal because of its schmitt flipflop, and its output levels are TTL compatible.

Alternatively, an infrared absorbing card material can be used, in which case the dummy bar ink should also absorb infrared, whereas the significant bars should be printed in an ink of the same color in the visible spectrum, but which reflects infrared radiation. Another possibility would be for all the bars themselves to be printed in the same infrared absorbing ink, but for the significant bars to be varnished with an infrared reflecting varnish. If the varnish is visible in ordinary light, then the rest of the card, including the dummy bars, should also be varnished, but with a varnish that does not reflect infrared.

When individual cards are printed, it is convenient that the automatic machinery for printing the digital data message which the card is intended to carry should also determine where to put the dummy bars, and should control their printing as well. The available locations have already been discussed for the compressed type of code shown in FIG. 2. Rather more locations are possible in the type of code shown in FIG. 1, and in both cases it is additionally possible to lengthen the code arbitrarily (either between words only, or if the reading logic can cope, even within words) by entire decoy sequences of dummy bars.

A microprocessor will generally control the machinery for printing cards. It is relatively simple to program such a controller microprocessor to generate the data appropriate to the message, e.g. an access code followed by an expiry date, to determine the configuration of genuine bars which will convey the message, and then to determine where to put dummy bars between the genuine bars. This may include a random element if so desired. Finally, the microprocessor needs to be able to control bar printing on each of the tracks using the appropriate ink for the type of bar (genuine or dummy).

The same principle of dummy marks being printed in one or more sequences of genuine marks can readily be applied to any system in which the width of the spaces between genuine bars does not in itself convey significant information. Where the width of the spaces between marks does convey information, as in the "United Product Code" (the commonly seen bar code used in retail checkout points, for example), it is still possible to scramble a message to some degree, e.g. by inserting a unit width dummy bar in a three unit significant space.

A preferred form of card is made of plastic of suitable thickness to remain rigid. It is rectangular in shape and has two bar code tracks marked on opposite faces. The plastic is chosen to have substantially the same optical properties as the dummy bar ink when viewed in the designated portion of the spectrum with a given type of pick-up. Genuine bars have a complementary property. (In this context complementary optical properties include absorption/reflection, transmission/reflection, transmission/absorption, i.e. transparent or opaque.

FIG. 7 is a simplified block diagram of a system for controlling access to a given service. In the present case the service is a broadcast pay-TV service where the TV transmission is picked-up from the air, but cannot be viewed until unscrambled by the system for controlling access to the TV program as a function of the data recorded on the card. The same principles apply to pay-TV which is received over a cable, and in either case, there is no convenient way of controlling access to programs which are not scrambled. The equipment used for scrambling and unscrambling is not described in detail since it is not specifically relevant to the present invention and has been fully described in other documents.

FIG. 7 shows a TV transmitter system 40. An ordinary composite video signal (i.e. including a picture signal S plus synchronizing pulses P) is generated by a TV generator 41. The composite S+P signal is applied to a first input 43 of a multiplexer 45 having its output 47 connected to the input 51 of a TV transmitter which broadcasts on a high frequency carrier via an omnidirectional antenna 52. Sound is also provided in the conventional manner, but is not treated in any further detail in this description.

The TV generator 41 applies the synchronizing signal P to an input 49 of a control circuit 48 which delivers a two-state output signal M for switching over the multiplexer 45 from time to time from receiving the composite TV signal to receiving a data signal D as provided at a second input thereto 44 by a data signal generator 42. The data signal contains information about the TV program being broadcast, e.g. defining a category of paying customer entitled to view the program. The control circuit selects appropriate moments for applying the data signal to the transmitter 50 so as to avoid interfering with the program.

The broadcast TV signal is picked-up by a receiving antenna 61 connected to a receiver 62, which selects a desired broadcast by the usual channel (i.e. broadcast frequency) selection means. The receiver generates an IF signal which is applied to a demodulator 63 to provide a composite video plus data signal S/P/D. This is amplified by an amplifier 64 for forwarding to a TV console 68. The signal S/P/D is also applied to a circuit 65 for extracting the synchronizing signal P and to a circuit 66 for extracting the data signal D. The data signal extraction circuit naturally needs a connection to receive the synchronizing signal P from the circuit 65, in order to enable it to determine the periods when the signal M is being generated at the transmitter and to pass a signal to its output only when the composite signal is constituted by data.

The synchronizing signal P and the data signal D are applied to a card reader 70. The card reader includes a two-pick-up card reader 72 having pick-ups 73 and 74 which apply the pulse signals V'A and V'B to a microprocessor 75 via respective inputs 76 and 77. The microprocessor has an input 78 connected to receive the data signal and an input 79 connected to receive the synchronizing signal. The card reader and its pick-ups are suitably designed to be sensitive to significant bars only on a card 5 being input thereto, thus ensuring that the microprocessor is unencumbered by spurious inputs from dummy bars (except if the card is counterfeit). Various other pick-ups, not shown, would normally be incorporated in the card reader, e.g. for sensing whether a card is present or absent, or for detecting the arrival of a card to ready the microprocessor for decoding.

The microprocessor 75 converts the pulse signals V'A and V'B into the corresponding data words, and also stores the transmitted data D. Assuming that the data on the card and the transmitted data D are compatible (e.g. the cardholder is a paid-up subscriber for the TV service which the receiver is receiving) the microprocessor generates an enable signal on an output 80 which is applied to a gate 67 inserted between the amplifier 64 and the TV console 68. Horizontal and vertical synchronizing signals H and V respectively are generated by a sync. generator 69 which is connected to receive the synchronizing pulses P. The signals H and V are applied directly to the console 68 regardless of whether the video signal is being passed correctly by the gate 67.

Clearly, if the user is to be prevented from using an ordinary TV set without card reading means for viewing the program, the transmitter system 40 must scramble the video portion, at least, of the TV signal before broadcasting it, and the gate must include complementary unscrambling means. Numerous schemes have been devised for doing this, and several such schemes are described in the following French published patent specification Nos.: 2,313,825; 2,404,350; 2,393,480; 2,404,350; and 2,506,100. Similarly the range of information which can usefully be encoded on the card is wide, and further reference can be made in this respect to published French patent specification Nos. 2,448,824; 2,448,825; 2,448,826; and 2,459,595.

The system shown in FIG. 7 is functionally incomplete without means for dispensing cards in the first place. Such means could be located in shop premises where potential users would call to obtain a card matching their requirements or in office premises for use (by the users) by correspondence. In any event, a card dispensing machine would be a stand-alone device and the cards issued would remain valid for some predetermined period of time.

The invention is particularly applicable to systems which give access to services that are relatively cheap in themselves, and which do not warrant the considerable expense given to safety measures in systems such as bank note dispensers. While it is not impossible that the invention could be perfected to such a standard of security, that is not the presently preferred field of use for the invention.

We claim:

1. An optically readable card for carrying a digital data message, comprising:
   at least one succession of marks and spaces having respective different optical properties, the marks and spaces being detectable by an opto-electronic pick-up means, the pick-up means including a source of light radiation and a detector therefor;
   wherein the succession of marks includes genuine data-significant marks having a first optical spectral response to light emitted by the source of light radiation, the genuine data-significant marks being interspersed with dummy or decoy marks having the same appearance visually and photographically as the genuine data-significant marks, the dummy or decoy marks responding to light emitted by the source of light radiation with a second optical spectral response, the second response being analogous to the response of the spaces to the light radiation.

2. An optically readable card according to claim 1, wherein said digital data message is encoded as a succession of bars of equal width disposed side-by-side along two distinct tracks, with data-significant bars representative of binary "1" digits being written in succession on a first one of said tracks, and with data-significant bars representative of binary "0" digits being written on a second one of said tracks which extends parallel to said first track, successive bars on either track, whether they be data-significant bars or dummy bars, being separated from one another by intervening spaces of equal width to said bars or of width equal to an integer multiple thereof, each track being read by a corresponding opto-electronic pick-up during motion in a predetermined direction of the card relative to the pick-ups, each of said pick-ups providing a succession of pulses corresponding to the succession of data-significant bars on the corresponding track.

3. An optically readable card according to claim 2, wherein said parallel tracks are disposed on opposite sides of the card.

4. An optically readable card according to claim 1, wherein said card is made of material having a surface which reflects infrared radiation.

5. An optically readable card according to claim 4, wherein said data-significant marks are printed using an ink of a predetermined visible color, said ink being an absorber of infrared radiation.

6. An optically readable card according to claim 5, wherein said dummy marks are printed using an ink of the same predetermined visible color, said ink being transparent to infrared radiation.

7. An optically readable card according to claim 4, wherein said card is made of plastic material which is thick enough to ensure that the card is rigid.

8. An optically readable card according to claim 4, wherein said card is made of paper.

9. An optically readable card according to claim 1, wherein said card is made of a material which absorbs infrared radiation, wherein said data-significant marks are printed using an ink of a predetermined visible color which reflects infrared radiation, and wherein said dummy marks are printed using an ink of the same predetermined visible color which absorbs infrared radiation.

10. An optically readable card according to claim 2, wherein said digital data message is encoded as a sequence of data words (e.g. 8-bit bytes) in such a manner that two successive data-significant bars in the same data word but on different tracks because they are representative of complementary binary digits are located substantially immediately adjacent to each other, and wherein dummy bars are inserted in locations selected from the following possible locations:
    before the first word in a data message;
    after the last word in a data message;
    between two successive words in a data message where the last bit of one word is the same as the first bit of the next word; and
    between successive occurrences of the same bit within a data word.

11. In an access control system using optically readable cards for giving card-holders access to a service, each of the cards including at least one succession of marks and spaces having respective different optical properties, and wherein the succession of marks includes genuine data-significant marks, the genuine data-significant marks being interspersed with dummy marks having the same appearance visually and photographically as the genuine data-significant marks, the access control system comprising:
    an optical reader having two pick-ups, each pick-up including a source of light radiation of predetermined spectrum for giving a first optical response when inspecting the genuine data-significant marks and for giving a second optical response when inspecting spaces or dummy marks; and
    a detector of the light radiation for detecting the optical responses, the detector being insensitive to that portion of the visible light spectrum which is absent from the predetermined spectrum;
    whereby the dummy marks are treated as spaces.

* * * * *